United States Patent
Kodialam et al.

(10) Patent No.: US 6,584,071 B1
(45) Date of Patent: Jun. 24, 2003

(54) ROUTING WITH SERVICE LEVEL GUARANTEES BETWEEN INGRESS-EGRESS POINTS IN A PACKET NETWORK

(75) Inventors: Muralidharan S. Kodialam, Marlboro, NJ (US); T. V. Lakshman, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/366,620

(22) Filed: Aug. 3, 1999

(51) Int. Cl.$^7$ .............................................. H04L 12/56
(52) U.S. Cl. ................... 370/238; 370/238.1; 370/397; 370/399; 370/252; 709/241
(58) Field of Search ............................. 370/235–238.1, 370/354, 355, 395, 397, 399, 252, 359; 379/221.06–221.07; 709/235–241

(56) References Cited

U.S. PATENT DOCUMENTS

| | | | | |
|---|---|---|---|---|
| 4,870,639 A | * | 9/1989 | Hayashi et al. | 370/415 |
| 5,233,604 A | * | 8/1993 | Ahmadi et al. | 370/238 |
| 5,999,286 A | * | 12/1999 | Venkatesan | 359/117 |
| 6,301,244 B1 | * | 10/2001 | Huang et al. | 370/238 |
| 6,321,271 B1 | * | 11/2001 | Kodialam et al. | 370/351 |
| 6,347,078 B1 | * | 2/2002 | Narvaez-Guarnieri et al. | 370/230 |
| 6,377,551 B1 | * | 4/2002 | Luo et al. | 370/238 |

FOREIGN PATENT DOCUMENTS

EP 0753979 A1 * 1/1997 ........... H04Q/11/04

\* cited by examiner

*Primary Examiner*—Hassan Kizou
*Assistant Examiner*—John M. Waxman (57) ABSTRACT

A packet network of interconnected nodes employs a method of routing with service level guarantees to determine a path through the network for a requested label-switched path (LSP). Each of the nodes includes one or more routers that forward packets based on a forwarding table constructed from paths determined in accordance with the method of routing with service level guarantees. The method of routing with service level guarantees determines the path of the requested LSP based on the effect that routing those packets of the requested LSP may have on current and/or future demands on the capacity of network nodes for currently provisioned LSPs. Such method of routing with service level guarantees may not necessarily route packets of a requested LSP along the shortest path, or minimum number of hops, through the network. Given the packet network and LSP request, a linear programming system may be defined by a set of linear programming equations for a non-split demand case. The linear programming system is based on the network topology, the values of the ingress-egress point pair o and t and demand bd of the LSP request, and the total maxflow values of the existing ingress-egress point pair for currently provisioned LSPs. To estimate the solution for the linear programming system, a subnetwork is formed using link weights and links removed that cannot support the requested demand. Link weights are calculated based on the critical links of a pseudo-network in which increased maximum flow along existing paths between ingress-egress point pairs is maintained. A shortest path routing algorithm may then be employed to generate a path, if available, for the LSP request using the subnetwork with the calculated link weights.

12 Claims, 7 Drawing Sheets

ROUTING WITH SERVICE LEVEL GUARANTEES BETWEEN INGRESS-EGRESS POINTS IN A PACKET NETWORK

CROSS-REFERENCE TO RELATED APPLICATIONS

This application is related to U.S. patent application filed on the same date as this application as Ser. No. 09/366,619, the teachings of which are incorporated herein by reference.

BACKGROUND OF THE INVENTION

1. Field of the Invention

The present invention relates to packet routing in telecommunication systems, and, more particularly, to determining paths through nodes of a packet network for routing of packets with guaranteed service levels.

2. Description of the Related Art

In interconnected communications packet networks, such as the Internet, users establish connections between a source and a destination with a stream of data packets, called packet flows, that are transferred through the network over a network path. The network path is defined by a set of nodes interconnected by a set of links. Packet networks may have a hierarchical structure in which smaller networks are interconnected by larger networks, and a peer structure in which equivalent networks are interconnected. At the highest levels, packet networks with high capacity that route packets transferred between other, outside packet networks are commonly referred to as "backbone" networks. A packet network connects to one or more other packet networks through ingress and egress points (routers) of the backbone network.

Figure 1:
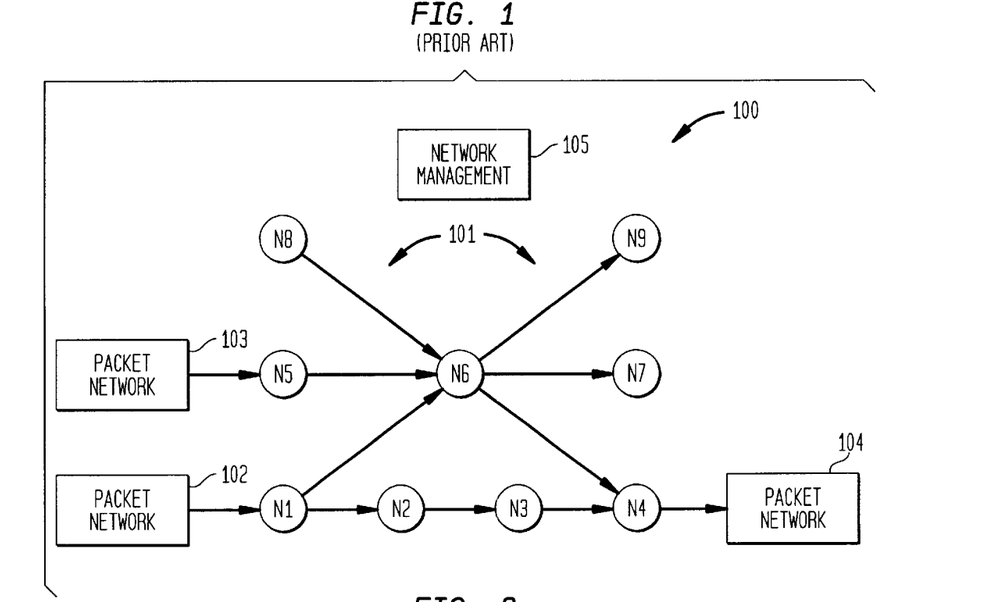
FIG. 1 shows a backbone network of the prior art having nodes interconnected through links that allow communication between lower-level packet networks.

FIG. 1 shows a backbone network 100 of the prior art having nodes N1–N9 interconnected through links 101 that allow communication between packet networks 102–104. An ingress point is a router of node N1 that transfers packets to the backbone network 100 from a source (packet network 102), and an egress point is a router of node N4 that transfers packets from the backbone network 100 to a destination (packet network 104). The backbone network 100 may support an interior routing protocol to distribute network topology information and route packets between ingress and egress points based on best effort routing (e.g., destination-based shortest path) through the nodes N1–N9. A centralized network management system 105 may be employed to 1) provision virtual circuits, or packet flows, through the backbone network 100; 2) monitor capacity and utilization of links 101; and 3) coordinate calculation and installation of provisioned paths. Forwarding tables are used by each node's router to forward each received packet to the next node toward its destination. In addition, the centralized network management system 105 may also be employed to collect and distribute network topology information.

Interior routing protocols are employed by routers to determine forwarding of packets between a source and destination pair along a path through the nodes of the interconnected packet network. Packets received by a node's router are forwarded to other nodes based on a forwarding table constructed in accordance with the interior routing protocol or routes installed with explicit route provisioning. Interior routing protocols may also specify exchange network topology and link-state information ("network topology information") among routers to allow the node's router to construct the corresponding forwarding table. An example of a widely-used interior routing protocol for "best effort" routing is the Open Shortest Path First (OSPF) protocol. In addition, some routing protocols associate a link "cost" with each link between nodes. This link cost may be associated with, for example, average link utilization or revenue generated by the link, as well as link importance in the network. When link-state information or link-bandwidth (e.g., connectivity or available bandwidth) is exchanged between routers, each router in the network has a complete description of the network's topology.

Since routing of packets at the higher levels is desirably performed at high speed, each higher-level packet network may use its own interior routing protocol in addition to the interior routing protocol of the lower-level packet network. Routing protocols, in addition to providing connectivity, may also enable traffic management. The Multi-Protocol Label Switched (MPLS) standard, for example, allows such routing protocols in backbone networks. The MPLS standard may be employed for networks having virtual circuits (packet flows) with provisioned service levels (also known as guaranteed quality-of-service (QoS)).

Provisioned service levels may be, for example, a guaranteed minimum bandwidth for the path of a packet flow through the backbone network. This path having a guaranteed level of service between ingress and egress points may be referred to as a Network Tunnel Path (NTP). As would be apparent to one skilled in the art, specific implementations of NTPs exist for different types of networks. As examples of NTPs, virtual circuits may be established for packet flows in TCP/IP networks, virtual circuits may be established for cells in Asynchronous Transfer Mode (ATM) networks, and label switched paths (LSPs) may be established for packets in MPLS networks. Packets of a signaling protocol, such as RSVP (Reservation Protocol for IP and MPLS networks) or LDP (Label Distribution Protocol for MPLS networks), may be used to reserve link bandwidth and establish an NTP, once routing for the NTP is calculated. NTPs may be provisioned as an explicit route along specific paths between nodes of the backbone network (i.e., when an NTP is provisioned, all intermediate points may be specified through which a packet passes between the ingress and egress points of the NTP).

Figure 2:
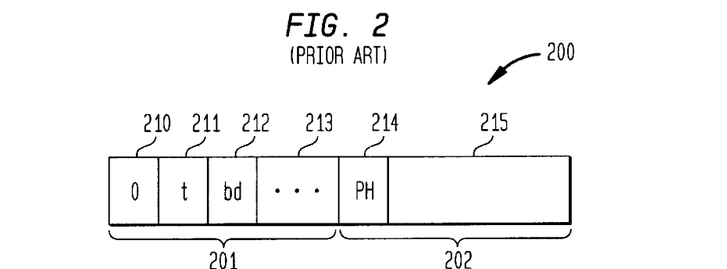
FIG. 2 shows an encapsulated packet employed by the backbone network of FIG. 1 to route packets from an ingress point to an egress point.

In MPLS networks, packets are encapsulated by appending to the packet, or forming from the packet, additional information when the packet is received at an ingress point. The additional information, called a label, is used by routers of the backbone network to forward the packets. FIG. 2 shows such an encapsulated packet 200 having a label 201 appended to packet 202. The label summarizes information in the packet header. The summary may be based on the header field and include an origination (source) address field (o) 210 identifying the address of the ingress point, a termination (destination) address field (t) 211 identifying the address of the egress point(s). In some cases, the label may simply be a pointer that identifies or is otherwise related to specific origination and termination address fields in the header of the received packet. The label also includes one or more service level fields (bd) 212. Service level field 212 may identify a desired service level for the virtual circuit (called a "demand"), such as minimum bandwidth required. In some networks, the service level field is implied from the label itself. Other fields 213 may be included in the label 201, such as MPLS standard version, interior routing protocol version, maximum delay, or other types of service level parameters. The label 201 may alternatively be inserted into the packet header (PH) 214 of the packet 202, so the order of fields shown in FIG. 2 is exemplary only. Backbone networks may employ labels to group encapsulated packets having similar LSPs into classes (equivalence classes), and methods for forwarding equivalence classes may be employed to simplify calculation of routing for LSPs.

To generate a forwarding table, each router computes a set of preferred paths through the network nodes, and may use the weights to calculate the set of preferred paths. Each preferred path has a minimum total weight between nodes as well as minimum summed weight through nodes of the path, which is known in the art as shortest-path routing. This set of preferred paths may be defined with a shortest-path tree (SPT). The forwarding table with routing information (e.g., source-destination pair, source ports, and destination ports) is generated from the SPT. The router uses the routing information to forward a received packet to its destination along the shortest path of the SPT. The SPT may be calculated using an algorithm such as Dijkstra's algorithm, described in E. Dijkstra, "A Note: Two Problems In Connection With Graphs," Numerical Mathematics, vol.1, 1959, pp. 269–271.

A common shortest-path routing algorithm employed by routers to generate routing of an LSP is the min-hop algorithm. In the min-hop algorithm, each router calculates a path through the backbone network for the stream of packets (packet flows) between the ingress and egress point. Each router constructs a path for routing the packet flow from the ingress point to the egress point with the least number ("min") of feasible links ("hops") (a feasible link is a link that exists and has sufficient capacity to route the packet flow). Routing schemes of the prior art, such as shortest-path routing, forward packets based only on destination addresses and use only static and traffic-characteristic-independent link weights to calculate paths for routing tables. Some links on the shortest path between certain pairs of ingress and egress points may be congested while other links on alternate paths are under-utilized.

A signaling mechanism, such as RSVP or LDP, may be employed to both reserve and establish a connection through the network for a packet flow. The signaling mechanism may specify quality-of-service attributes for the LSP traversing the backbone network. Link congestion caused by shortest-path routing of multiple LSPs by shortest path routing may cause rejection of reservation requests by signaling mechanisms, even though sufficient levels of service (quality of service guarantees) for the LSP may have existed in alternate, under-utilized paths that are only slightly longer. Available network resources are not efficiently utilized when shortest-path routing is employed.

SUMMARY OF THE INVENTION

In accordance with embodiments of the present invention, data is routed along paths through a network of nodes interconnected by links and having a plurality of ingress-egress point pairs. Routing data along paths includes receiving a request for a path with a service demand for routing data between one of the ingress-egress point pairs of the network. A subnetwork of nodes and links is defined from the network based on the service demand. A set of weights is defined for the links of the subnetwork taking into account impacts to existing service levels of paths corresponding to the other ingress-egress point pairs of the network. A shortest path through the subnetwork is determined in accordance with the set of weights for the links, the shortest path being the path with the service demand between the one of the ingress-egress point pairs of the network.

For some exemplary embodiments, the routing method determines a preferred path for a new network tunnel path (NTP) request. The preferred path is defined between a pair of ingress and egress points through the nodes of a packet network and maintains provisioned and requested levels of Quality of Service (QoS). The preferred path through the nodes is selected so as to reduce impact to service levels of paths of other currently provisioned NTPs passing through each particular node that is selected for the preferred path. The routing method determines the preferred path based on shortest path routing through a subnetwork derived from the network topology, the subnetwork defined with link weights determined from critical links. The critical links are links identified based on remaining bandwidth on the links, position in the network relative to ingress-egress point pairs, and a criterion for generally maintaining relatively high QoS or other service levels over all paths between ingress-egress point pairs. Generally, the routing method maintains relatively high service levels (e.g., bandwidth) available in existing paths for future NTP requests between all pairs of ingress and egress points in the network after routing the new NTP request.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 3:
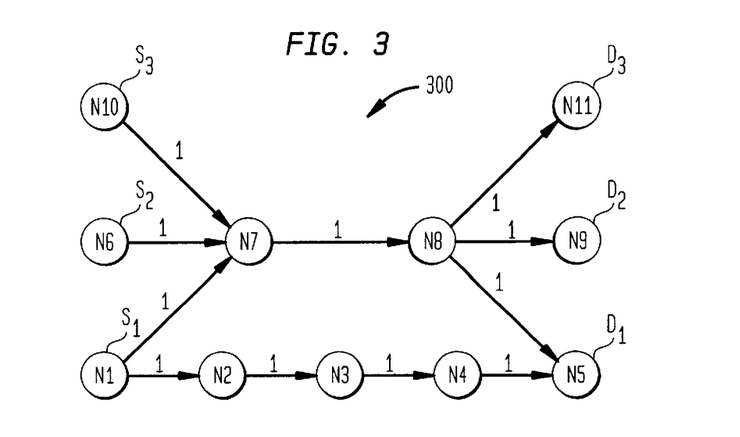
FIG. 3 shows a network of interconnected nodes that employs a method of routing with service level guarantees for routing label-switched paths in accordance with the present invention.

FIG. 3 shows a network 300 of interconnected nodes N1–N11 that employs an exemplary implementation of the routing method with service level guarantees in accordance with the present invention. The routing method determines a path through network 300 for a request for a network tunnel path, such as a label-switched path (LSP). Each of the nodes N1–N1 includes one or more routers that forward packets based on a forwarding table constructed from paths determined in accordance with the routing method. The routing method may route packets of the requested LSP based on the effect that routing those packets of the requested LSP may have on current and/or future demands on the capacity of network nodes for currently provisioned LSPs. The effect is also referred to as "interference" by routing packets of the LSP request along a path. Such routing method may not necessarily route packets of a requested LSP along the shortest path, or minimum number of hops, through the network. Such routing should maintain as much available capacity on the links, based on a pre-defined criterion, after routing of the LSP request.

While the exemplary embodiments of the present invention are described herein for networks employing the MPLS standard with path requests with associated service levels, such as LSP requests, the present invention is not so limited. The present invention may be employed where requests are received for Network Tunnel Paths (NTPs) having a guaranteed level of service between ingress and egress points. NTPs may be, for example, virtual circuits for packet flows in TCP/IP networks, connections of cells in Asynchronous Transfer Mode (ATM) networks, and LSPs)for packets in MPLS networks). In accordance with the present invention, routing for a new NTP request is calculated based on network topology, bandwidth (or other service level) of the links, and remaining bandwidth (or other service level) of the links when existing NPTs are routed and a request for a new NPT is received.

A network of interconnected nodes such as network 300 is defined as G(N, L, B), where N is the set of routers (nodes), L is the set of links (arcs), and B is the set of available resources for corresponding links in the set L (referred to herein as the set of link bandwidths, which may be residual bandwidths described below). For the exemplary embodiments described herein, the value for available resources such as service level is bandwidth capacity of a link or path, but the service level values may be link parameters such as delay, probability of packet loss, revenue, or other quality of service parameter. As known in the art, these other service level values may be converted to a quantity termed effective bandwidth. A link $l_{ij}$ in the set of links L has two subscripts, i and j ($0 < ij \leq N$), representing the nodes $n_i$ and $n_j$ connected by link $l_{ij}$. Without loss of generality, each link $l_{ij}$ is directional (packet flows go from node $n_i$ to node $n_j$).

Sources $S_1$, $S_2$, and $S_3$ in FIG. 3 may be packet networks providing packet flows to routers in nodes N1, N6, and N10, respectively. Similarly, destinations $D_1$, $D_2$, and $D_3$ may be packet networks receiving packet flows from routers in nodes N5, N9, and N11, respectively. Sources $S_1$, $S_2$, and $S_3$ are defined as ingress points, while destinations $D_1$, $D_2$, and $D_3$ are defined as egress points. Ingress-egress point pairs are defined as $(S_1, D_1), (S_2, D_2)$, and $(S_3, D_3)$, and each node may support one or more sources, or one or more destinations. Nodes N1–N11 may also have, or have access to, current network topology and link status information (hereinafter referred to as "network topology") which may be provided and distributed through the network using a distributed protocol (e.g., by control packets conforming to the OSPF protocol).

Sources $S_1$, $S_2$, and $S_3$ generate packets for new or currently provisioned LSPs in network 300 that include fields identifying the ingress-egress point pair (e.g., address of either source $S_1$, $S_2$, or $S_3$ and address of destination $D_1$, $D_2$, and $D_3$). Signaling packets of, for example, RSVP or LDP may be used to communicate quality-of-service (QoS) attributes or guarantees, such as bandwidth, to network elements (routers of nodes); however, packets of LSPs may also include values for one or more service-level parameters corresponding to QoS attributes or guarantees. These packets of LSPs transferred through network 300 may conform to the MPLS standard and may have a format similar to that shown and described with respect to FIG. 2.

For network 300 shown in FIG. 3, three potential ingress-egress point pairs (source-destination pairs) $(S_1, D_1), (S_2, D_2)$, and $(S_3, D_3)$, are shown. For the following discussion, each link $l_{ij}$ interconnecting adjacent nodes $n_i$ and $n_j$ has an associated available capacity, termed residual bandwidth. Residual bandwidth of a link $l_{ij}$ is the difference between the total bandwidth of the link and the sum of the bandwidth demands of LSPs that are currently assigned to that link. Networks may exchange information regarding residual capacity of links (such as in QoS shortest path first (QoSPF) networks), which may be employed for distributed calculation of routes. Residual bandwidth may commonly be expressed in, for example, kbits/sec or Mbits/sec, or may be expressed as a percentage of the link's total capacity. Each link $l_{ij}$ interconnecting adjacent nodes $n_i$ and $n_j$ may also have an associated link cost. Link cost may be assigned to a particular link to allow routing algorithms to favor or disfavor routing through the particular link because of, for example, delay, cost to provide bandwidth, other traffic engineering considerations, or other physical link-layer considerations.

In general, a request arrives to network 300 to provision and route a path between an ingress point o and egress point t, and also to provide a route having a requested service level of bd (a "demand" bd). For the exemplary network of FIG. 3, this may be an LSP or other form of NTP request to provision a path between source-destination pair $(S_1, D_1)$ with a requested bandwidth bd Mb/sec. LSP requests may arrive one at a time, with no a priori knowledge of the characteristics of demands for bandwidth by future LSP requests. In addition, no a priori knowledge of the characteristics of QoS attributes or guarantees; connection arrivals, hold time, or departures; and other traffic engineering information is necessarily available. The demand bd may be an "equivalent" or "effective" bandwidth value since the packets of a packet flow may represent a stochastic process with varying bandwidth needs. As is known in the art, service-level (e.g., QoS) attributes or requirements may be translated into an equivalent or effective bandwidth value. The equivalent or effective bandwidth value is a deterministic value approximating the stochastic variable based on peak and average packet rate, arrival and hold times, and connection duration.

Routing in accordance with the present invention evaluates and routes the LSP along paths through the network between ingress-egress point pairs. The set P is the set of specific (distinguished) node ingress-egress point pairs included in the network G(N, L, B) that are the potential ingress-egress point pairs (i.e., source-destination pairs $(S_1, D_1), (S_2, D_2), \ldots, (S_k, D_k)$). An element of the set P is denoted as (s, d) (i.e., (s, d)∈P) where s and d correspond to a source and a destination node. Multiple LSPs may be provisioned between an element (s, d).

Each element (s, d) has an associated maximum packet flow (maxflow) value $\theta_{sd}$ that corresponds to an upper bound for the total bandwidth (or other service level) in a path that may be routed between a ingress-egress point pair, or element, (s, d), after routing with demands of currently provisioned LSP requests. The value $\theta_{sd}$ changes as bandwidth across links in the set L is assigned and re-assigned when provisioning and deleting LSPs. In addition, each element (s, d) of the set P may have an associated scalar weight $\alpha_{sd}$ that may correspond to a relative usage, importance, or cost of the particular ingress-egress point pair. The maxflow value $\theta_{sd}$ may decrease (increase) when bandwidth is allocated (released) for LSPs between the ingress-egress point pair (s, d). The maxflow value $\theta_{sd}$ may also decrease (increase) when bandwidth is allocated (released) for LSPs between other ingress-egress point pairs in the set P whose paths share common links between nodes with the path of the element (s, d).

An LSP request to network 300 may be either through a centralized network management system (not shown in FIG. 3) or by control messages provided to nodes N1–N11 of the network 300 in accordance with a distributed protocol. Either a centralized network management system and/or each network router implements an exemplary routing method for the LSP request and determines a path to be provisioned through the network corresponding to the requested LSP. Provisioning by either the centralized network management system and/or each network router allows RSVP control (e.g., QoS requests of the RSVP signaling protocol) to establish connections (packet flows) with, for example, a demanded bandwidth or other type of service level.

The node-arc incidence matrix M is defined as an f×g matrix in which each row corresponds to a different node n of the set N, and each column corresponds to a different link l of the set L. The value for f is equal to the number of elements of the set N, and the value of g is equal to the number of elements of the set L. Each column has two non-zero entries (i, j) for the corresponding link $l_{ij}$ between nodes $n_i$ and $n_j$. The column corresponding to link $l_{ij}$ has a "+1" value in the row i, a "−1" value in the row j, and a "0" value in each position corresponding to all other rows.

The residual capacity vector R of length g is the vector including the residual capacities for the set of links L. The values in the vector R are initialized to the corresponding link bandwidth values $b_{ij}$ of the set B. After all current LSP requests are routed, the residual capacity $r_{ij}$ of link $l_{ij}$ is defined as the difference between 1) the total link service level (e.g., bandwidth) $b_{ij}$ of link $l_{ij}$ and 2) the sum of the service levels (e.g., bandwidth demands) of LSP requests currently routed on link $l_{ij}$. For the network, if the residual bandwidth of a link is greater than or equal to the bandwidth value of the requested LSP, the link is referred to herein as a feasible link (with respect to the given demand of the LSP request).

The service level vector $x^{sd}$ is a vector of length g corresponding to the element (s, d). The values in the vector $x^{sd}$ correspond to the route of packet flows in the set of links L to achieve the maxflow values $\alpha_{sd}\theta_{sd}$, as defined and described subsequently, between element (s, d) along the corresponding links of the ingress-egress point pair. Each position in the vector has a value that corresponds to a link.

The element vector $e^{sd}$ is a vector of length f of elements (s, d) having a "+1" value in position s, a "−1" value in position d, and "0" value in the other positions.

An integer programming system may be formed for a non-split demand added to the existing network. For the non-split demand case, LSP requests arrive one at a time, and the demand bd (i.e., packets of the packet flow) of the LSP request may only be allocated along one path within the network G(N, L, B). The solution for the non-split demand is a set of paths for all LSPs (new and currently provisioned) that desirably maximizes the maxflow values $\theta_{sd}$ and $\theta_{ot}$ for all ingress-egress point pairs (all elements in the set P and including the element (o, t). The integer programming system for the non-split demand implementation may be represented by equations (1) through (6):

$$\text{Max}\Sigma_{(s,d)\in P/(o,t)}\alpha_{sd}\theta_{sd} \text{ is true} \quad (1)$$

$$Mx^{sd}=\theta_{sd}e^{sd} \text{ for all } (s,d)\in P/(o, t) \quad (2)$$

$$Mx^{ot}=-bde^{ot} \quad (3)$$

$$x^{sd}+x^{ot}\leq R \text{ for all } (s, d)\in P/(o, t) \quad (4)$$

$$x^{sd}\geq 0 \text{ for all } (s, d)\in P \quad (5)$$

$$x^{sd}\in\{0, bd\} \quad (6)$$

where (s, d)∈P/(o, t) is defined as all elements (s, d) of the set P but not including the element (o, t).

Equation (1), while being a "logic" equality, constrains the integer programming system so that when the new path is selected for element (o, t), the resulting allocation of the demand bd yields a network G(N, L, B). As given in equation (1), the sum of the weighted maxflow values for the network is maximized (here, the term "maximized" is in the mathematical sense in that the answer approximates (is near) a maximum value of the variable). An alternative to equation (1) may be to maximize the minimum maxflow values (to prevent some links from being driven to near or at zero maxflow value). In general, as would be apparent to one skilled in the art, many various criteria exist for which the relative maxflow values between ingress-egress point pairs may be defined as being at a mathematical maximum. Maxflow values are upper bounds based on incremental LSP requests for bandwidth, or other service level. The selected criterion is assigned to equation (1) for the maxflow values.

For equation (1), solving the integer programming system determines the set of weighted maxflow values for the elements (s, d) of the network (except for the current pair (o, t)) once a portion of each link's service level is allocated from the residual capacity of the link if the link is included in a potential selected path for the new LSP request. After the solution is found, the solution includes a route for the new path such that the sum of the weighted maxflow values for the network approximates (is near) a new (mathematical) maximum value.

Equation (2) specifies the path routing through the network for each element (s, d) of the currently provisioned LSP requests and sets the link service levels for the links of the element's path to the maxflow values of equation (1). Prior to adding the demand bd for element (o, t) of the LSP request, equations (1) and (2) are initially the path routing and current maxflow values $\theta_{sd}$ for the network, which values may be used as initial values for the integer programming system.

Equation (3) adds the demand bd for element (o, t) to the network. When demand bd is allocated over the links in the vector $x^{ot}$ corresponding to element (o, t), the maxflow values change. Solving the linear programming system gives values for the vector $x^{ot}$ until equation (1) holds. These values both identify the links for the path of the new LSP request as well as give the allocation over the corresponding link.

Equation (4) and equation (5) impose non-negativity constraints. Equation (4) requires that the LSP is routed over links with sufficient residual bandwidth and equation (5) requires only positive-valued flows over the links in a path. Equation (6) constrains the integer programming system such that each component of $x^{ot}$ is either 0 or bd. This constraint transforms a linear programming problem into the integer (0–1) programming system.

The integer programming system of equations (1) through (6) may be solved to determine a non-split demand path selection for an LSP request (o, t, bd), but for a large network such solution may be impractical. Such solution may be impractical because path selection for the LSP request should be completed, and new routing tables disseminated through the network, relatively quickly, before additional LSP requests arrive.

Consequently, in accordance with the present invention, the network G is simplified to allow an estimate (or "relaxed") solution to the integer programming system of equations (1) through (6).

The network G is simplified into a subnetwork of only those nodes and links that may support the path for the added demand of the LSP request. The complexity of the subnetwork is reduced by finding critical links (i.e., links through nodes that are subject to interference) that may be avoided for new routing. Weights are calculated and assigned to these critical links to force the algorithm that performs shortest path computation (e.g., shortest path routing) to avoid the critical links. Once the subnetwork and appropriate weighting derived from the critical links is calculated, a shortest path routing algorithm using the subnetwork topology may be employed for the shortest path computation.

An LSP request is generated for path routing of an LSP having demand bd between nodes $n_o$ for $S_m$ and $n_t$ for $D_m$. The subnetwork has ingress-egress point pairs (source-destination pairs) $(S_1, D_1), (S_2, D_2), \ldots, (S_k, D_k)$. Some LSP requests including the corresponding demands are already routed in the network G, and so a portion of the capacity of links of G, and, hence, the subnetwork, is already allocated.

Figure 4:
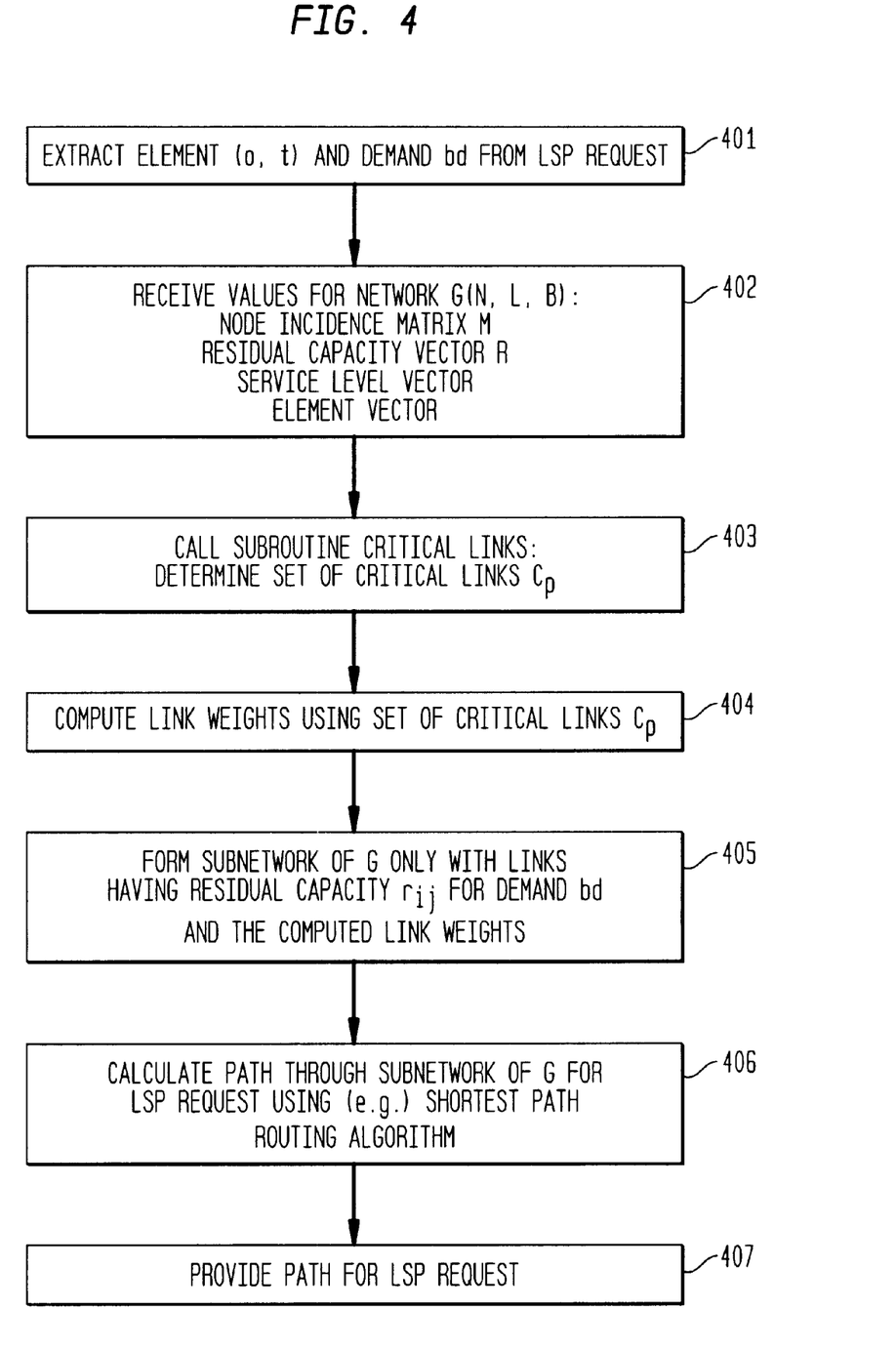
FIG. 4 is a flow chart showing an exemplary method of routing packets in accordance with the present invention.

FIG. 4 is a flow chart showing exemplary embodiment of a method of routing for an LSP request. First, at step 401, the demand bd and ingress-egress point pair $(S_m, D_m)$ for element (o, t) are extracted from the LSP request. At step 402, the input values are received that define the network G(N, L, B). The input values received may be: i) the node-arc incidence matrix M defined as an f×g matrix in which each row corresponds to a different node n of the set N, and each column corresponds to a different link l of the set L; ii) the residual capacity vector R of length g defined as the vector including the residual capacities for the set of links L; iii) the service level vector $x^{sd}$; and iv) the element vector $e^{sd}$.

Next, at step 403 the subroutine CRITICAL LINKS determines the set of critical links $C_p$ for all ingress-egress point pairs other than the ingress-egress point pair of the LSP request (i.e., for all elements (s, d)∈P for source-destination pairs $(S_p, D_p)$ except element (o, t) for source-destination pair $(S_m, D_m)$, where p≠m, (p, m)∈$G_b(N_b)$). $G_b$ is a pseudo-network of G as described subsequently, and $N_b$ is the set of nodes in $G_b$, where $N_b$ a subset of N. The set of critical links $C_p$ are links $l_{ij}$ defined between nodes $n_i$ and $n_j$ in the pseudo-network $G_b$, ($n_i$ and $n_j$ being termed source-sink pairs). A critical link is a link with the property that whenever an LSP request is routed over a path including the critical link, one or more maxflow values $\theta_{sd}$ for existing ingress-egress point pairs (corresponding to elements (s, d) of P/(o, t)) is reduced.

For exemplary embodiments of the present invention, the subroutine CRITICAL LINKS defines a pseudo network $G_b$ of network G that is defined comprising only i) feasible links $l_{ij}$ such that $R_{ij} \geq bd$ and ii) nodes interconnected by the feasible links. This pseudo network $G_b$ formed from network G may also be termed a feasible network.

At step 404, a link cost, termed a link weight, is computed based on the number of ingress-egress point pairs for which the link is a critical link. In one exemplary embodiment, for a given link $l_{ij}$, the associated value $NS_{ij}$ is the number of different source-sink pairs for which the same link $l_{ij}$ (arc) is a critical link (i.e., i.e. $l_{ij} \in C_p$). The associated value $NS_{ij}$ may, for example, be calculated as given by equation (7):

$$NS_{ij} = \sum_{p \neq m} I_{ij}^p \qquad (7)$$

where $I_{ij}^p$ P is one if the link $l_{ij} \in C_p$ and zero otherwise. Equation (7) is derived for the case where the weights $\alpha_{sd}$ are 1 for all elements (s, d). For this case of equation (7), for each link $l_{ij}$ the corresponding link weight $W_{ij}$ is $W_{ij} = 1 + NS_{ij}$. The more general case for varying $\alpha_{sd}$ and for determination of exemplary link weights for varying $\alpha_{sd}$ is described subsequently.

The link weights may be used with shortest path computation of shortest path routing algorithms. Link weights allow for flexibility when defining additional path constraints in the shortest path routing algorithm for path selection with, for example, either 1) maximum hop-count or 2) maximum delay constraint. The estimate of the relaxed solution initially sets the routed demand bd as zero, decoupling the linear system into p–1 independent maxflow calculations, one for each ingress-egress point pair element (s, d) of P/(o, t). The initial weighted maxflow calculation is $\alpha_{sd}\theta^{\wedge}_{sd}$ for maxflow $\theta^{\wedge}_{sd}$ of element (s, d) when bd is initially set to 0. With an incremental increase in the demand bd, the calculated value for the weighted maxflow $\alpha_{sd}\theta^{\wedge}_{sd}$ decreases, and there is a corresponding change in the residual link capacities $r_{ij}$ of the residual capacity vector R. For element (s, d), there is a residual capacity, denoted R(l), of each link $l_{ij}$ and a corresponding link weight $W_{ij}$, also denoted as w(l). The link weight w(l) is defined as the partial derivative of the weighted maxflow $\alpha_{sd}\theta^{\wedge}_{sd}$ sd with respect to the residual capacity R(l) of the link l, and may be as given in equation (8):

$$w(l) = \sum_{(s,d) \in P/(o,t)} \alpha_{sd} \frac{\partial \theta^{\wedge}_{sd}}{\partial R(l)} \qquad (8)$$

However, those skilled in the art will recognize that for the set of critical links $C_p$, the partial derivative $$\frac{\partial \theta^{\wedge}_{sd}}{\partial R(l)}$$

is one if link l is included in the set of critical links (i.e., if $l_{ij} \in C_p$), and zero. Consequently, for the general case, the link weights may be as given in equation (9):

$$w(l) = \Sigma_{(s,d): l \in C_p} \alpha_{sd} \qquad (9)$$

The weights $\alpha_{sd}$, as previously described, may be selected to reflect the importance of the ingress-egress point pair element (s, d). For example, when all the weights $\alpha_{sd}$ are one, as in the previously described implementation of FIG.

4, equation (9) reduces to equation (7). For some other embodiments the weights $\alpha_{sd}$ may be set as inversely proportional to the maxflow values $\theta_{sd}$. For these embodiments, such weighting discourages routing over critical links of those ingress-egress point pairs with low maxflow values (corresponding to highly utilized links). In addition, the weights $\alpha_{sd}$ may further reflect the residual capacity of the link (e.g., w'(l)=w(l)/R(l)). In the preferred embodiments of the present invention, if a link weight is zero, the link weight may be set to a very small number so as to not adversely affect the shortest path routing algorithm used to calculate the path for the LSP request.

Returning to FIG. 4, at step 405 a subnetwork of G is formed from the network of nodes and links of G, but with links $l_{ij}$ eliminated that do not have sufficient residual capacity to support the demand bd. The subnetwork of G may be based on the pseudo network $G_b$ formed during the computation of critical links in step 403 (described subsequently with respect to FIG. 5), but may also incorporate other forms of link weighting. The subnetwork of G also incorporates the link weights $W_{ij}$ calculated in step 404. At step 406, the path for the LSP request between the ingress-egress point pair $(S_m,D_m)$ for element (o, t) in the subnetwork of G is computed using a shortest path routing algorithm incorporating link weights, such as $W_{ij}$ (or w(l) for the general case). The shortest path routing algorithm may be similar to Dijkstra's algorithm using link weights $W_{ij}$ for links $l_{ij}$ when computing the shortest path tree. At step 407 this path is provided, and may be used to generate new forwarding tables.

Figure 5:
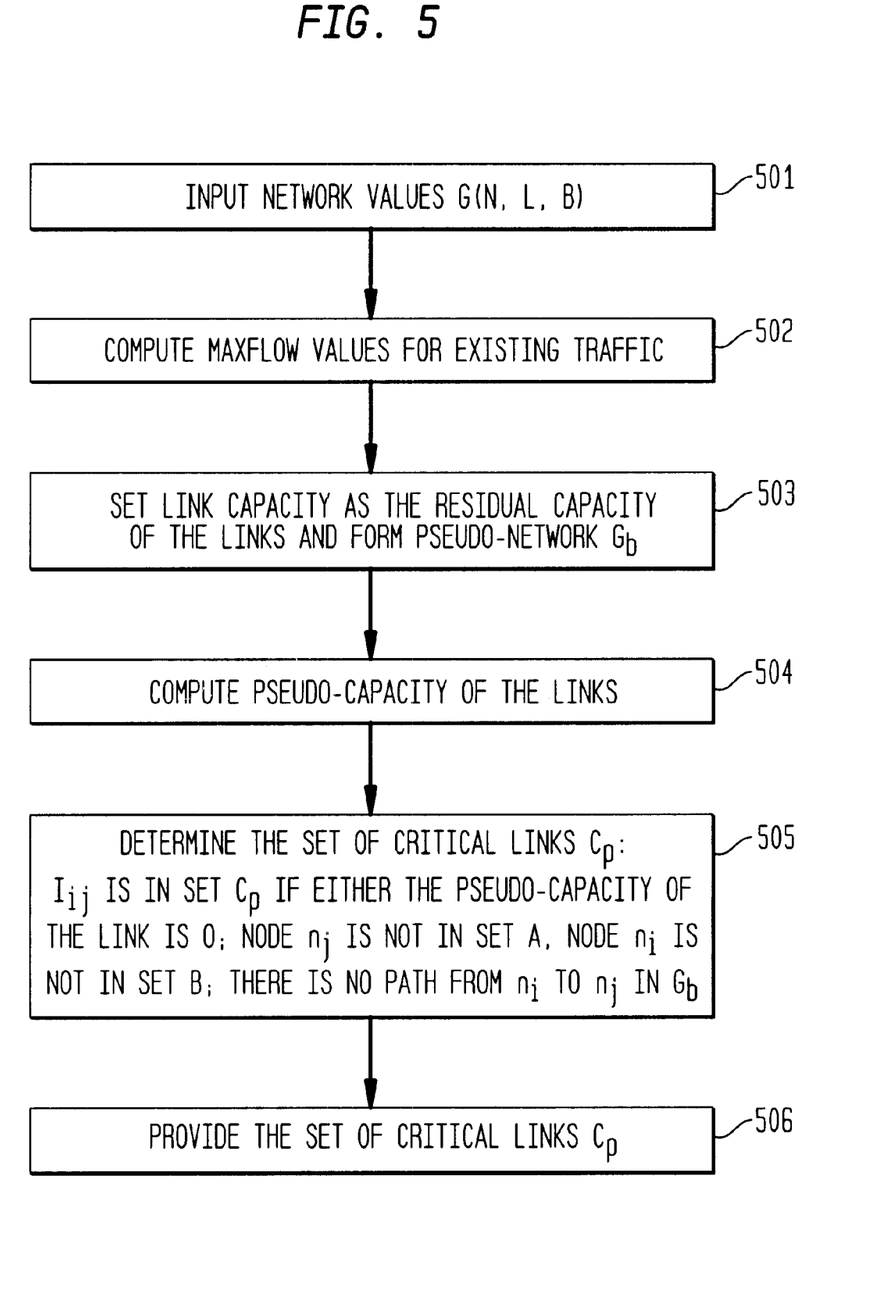
FIG. 5 is a flow chart corresponding to the step of determining critical links shown in FIG. 4.

FIG. 5 is a flow chart of the subroutine critical links shown in FIG. 4. At step 501, the input to the routine are the network values of steps 401 and 402 of FIG. 4. Next, at step 502 the maxflow values $\theta_{sd}$ are computed for the ingress-egress point pairs in the network G, not including the maxflow value of the ingress-egress point pair for element (o, t). Such computation of maxflow may be by any of various algorithms known in the art. For example, discussion of maxflow (or maximum flow) calculation is given in Ahuja, Magnanti, and Orlin, *Network Flows: Theory, Algorithms, and Applications*, Prentice-Hall, 1993, Chapter 7.

In step 503, the residual capacities $r_{ij}$ are used to generate the pseudo network $G_b$ containing the set of links $L_b$ links and set of nodes $N_b$ that may support the demand bd. The pseudo network $G_b$ is formed with the same nodes and links in G but with link (arc) capacities initially set to the current value for residual link capacity $r_{ij}$. At step 504 the capacity of the each link $l_{ij}$ in the pseudo network $G_b$ is set as the difference between the current residual capacity and the maxflow value over the path (edge) containing the link computed in step 502. The capacity of the link $l_{ij}$ calculated and set in step 504 may be termed the link's pseudo capacity.

At step 505, the pseudo network $G_b$ is examined to find the links that are critical links. The set A is defined as the set of nodes reachable from the node corresponding to the ingress point o (of source $S_m$) in the subnetwork $G_b$. The set B is defined as the set of nodes that may reach the node corresponding to the egress point t (of destination $D_m$) in the subnetwork $G_b$. For sets A and B, the terms "reachable" and "reach" refer to the existence of a directed path between the nodes that supports demand bd. In step 505, the set of links $C_p$ are determined (i.e., the link $l_{ij} \epsilon C_p$) by adding a link $l_{ij}$ to set $C_p$ if: a) the pseudo-capacity of link $l_{ij}$ is zero; b) node $n_i$ is not in A; c) node $n_i$ is not in B; and d) there is no path from $n_i$ to $n_j$ in the pseudo network $G_b$.

When all links of the pseudo network $G_b$ have been examined, step 506 provides the set $C_p$ as the set of critical links.

For specific implementations, the number of computations required for execution of the subroutine CRITICAL LINKS shown in FIG. 5 to generate the set of critical links $C_p$ may be dominated by the computations for the maxflow values.

If no path exists between the source and destination of the demand (i.e., no path between, then no path satisfies the solution and the LSP request is either rejected, or the demand modified and path selection recomputed. Once demand bd of the LSP request is accepted by determination of a corresponding path and the demand allocated (routed), the residual capacities of the links are recomputed and the method of FIGS. 4 and 5 is repeated for subsequent LSP requests.

Figure 6:
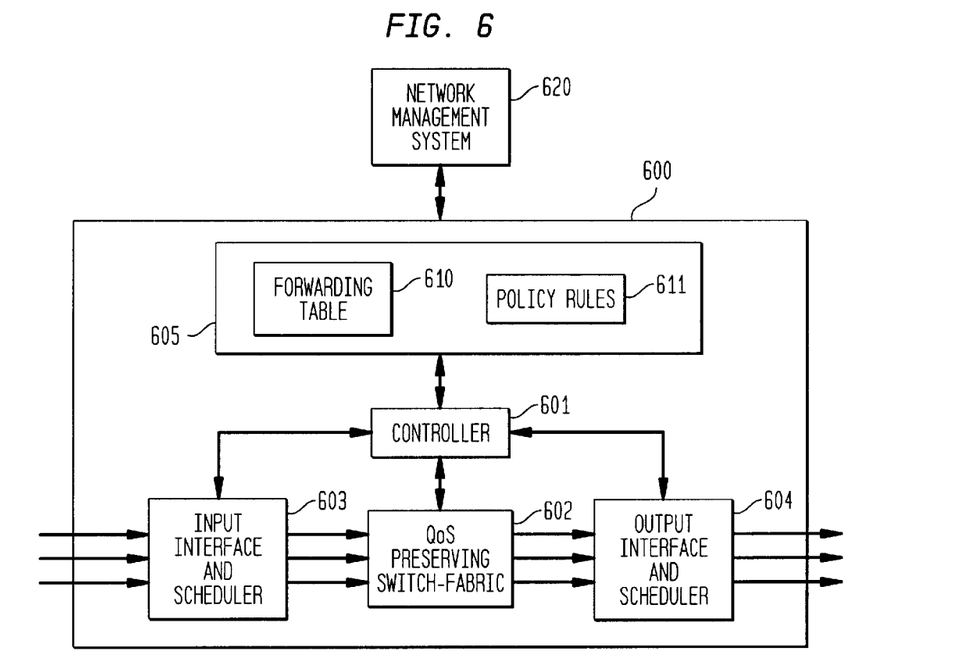
FIG. 6 is a block diagram of a routing processor that may employ the exemplary method of routing packets shown in FIGS. 4 and 5.

FIG. 6 shows an exemplary processing section of a router 600 implementing the constraint-based routing method of FIG. 4. Router 600 includes a controller 601, QoS preserving switch-fabric 602, input interface and scheduler 603, output interface and scheduler 604, and memory 605. QoS preserving switch-fabric 602 allows routing of packets through known or fixed delay, thereby allowing the network to account for the delay to maintain QoS levels. The input interface and scheduler 603 and output interface and scheduler 604 each include queues and service scheduling to maintain QoS levels. Memory 605 includes a forwarding table 610 and may also include a set of policy rules 611 for network routing. Controller 601 causes QoS preserving switch-fabric 602 to route packet flows between input interface and scheduler 603 and output interface and scheduler 604 based on labels (if MPLS network) or source and destination addresses (for IP networks) in accordance with the forwarding table 610. Forwarding table 610 may be constructed by controller 601 using information from a centralized network management system 620 that employs the constraint-based routing method shown in FIGS. 4 and 5. Alternatively, forwarding table 610 may be constructed in accordance with the constraint-based routing method by the controller 601 from network topology information and an NTP request contained in a control packet received at input interface 603.

For network 300 of FIG. 3 using min-hop routing of the prior art, the path calculated for the LSP request (o=$S_1$, t=$D_1$, bd=1 unit) would be through nodes N1 to N7 to N8 to N5 (lowest number of hops=3, with a total link cost of 3 assuming that each link has an associated weight and/or link cost of 1). Min-hop routing of packets between $S_1$ and $D_1$ along this path through nodes N1 to N7 to N8 to N5 for the requested LSP removes link capacity available to LSPs currently routed along the path between $S_2$ and $D_2$ as well as the path between $S_3$ and $D_3$. This example illustrates that an alternative path, such as the path through nodes N1 to N2 to N3 to N4 to N5 may be preferred, even though this alternative path has more hops, since this path does not cause interference with LSPs of other source-destination pairs routed through nodes N7 and N8.

Figure 7:
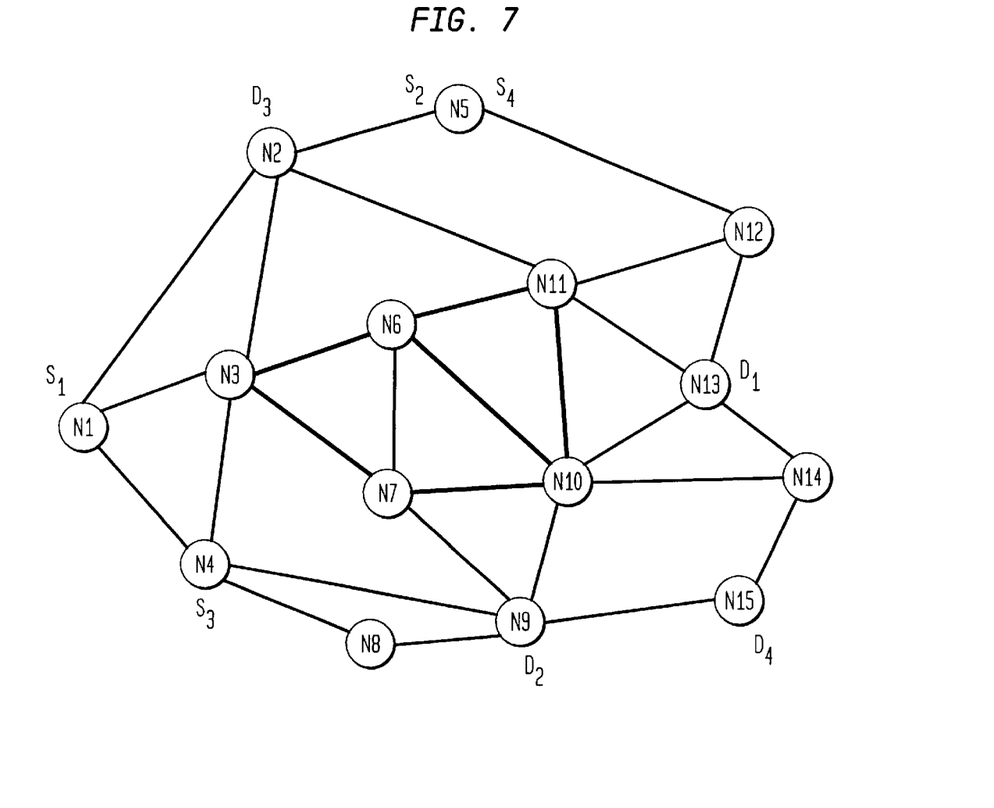
FIG. 7 shows an exemplary network of fourteen nodes having four ingress-egress point pairs and employed for simulations of exemplary implementations of the present invention.

FIG. 7 shows an exemplary network of nodes N1–N15 having four ingress-egress point pairs (source-destination pairs) ($S_1$, $D_1$) through ($S_4$, $D_4$) and corresponding path weighted maxflow values $v_{11}$ through $v_{44}$ (each $v_{sd}=\alpha_{sd}\theta_{sd}$ with $\alpha_{sd}=1$, s, d=1–4). The capacity of the light line links is 1200 units, and the capacity of the dark line links is 4800 units. An implementation of the exemplary method of routing with service guarantees shown in FIGS. 4 and 5 (termed the minimum interference routing algorithm (MIRA)) may be simulated using the network of FIG. 7. For the path sequences in Table 1, the prefix "N" for each node in FIG. 7 is omitted.

Figure 8:
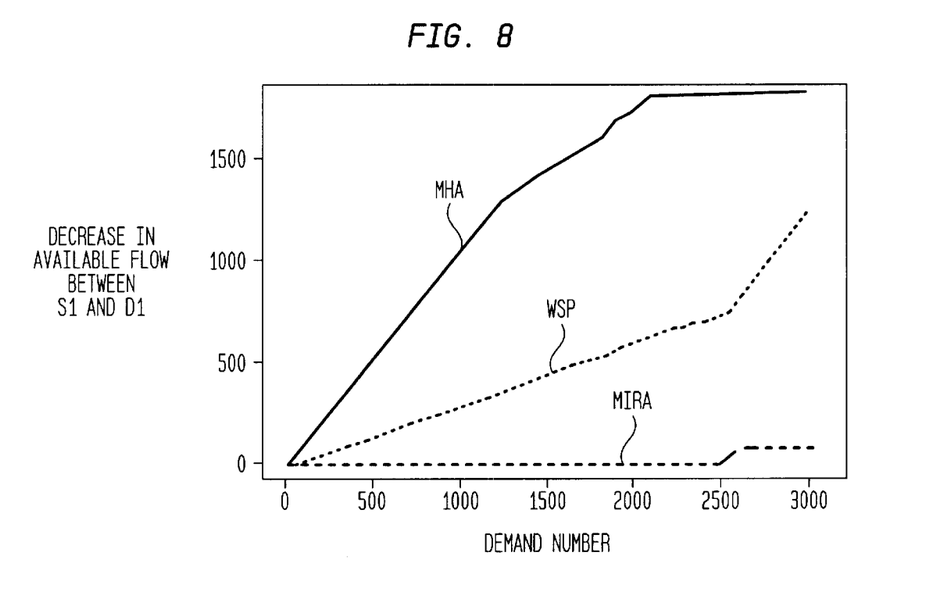
FIG. 8 is a graph of simulation results showing decrease in available flow between an ingress and egress point pair for increasing demand of LSP requests.
Figure 9:
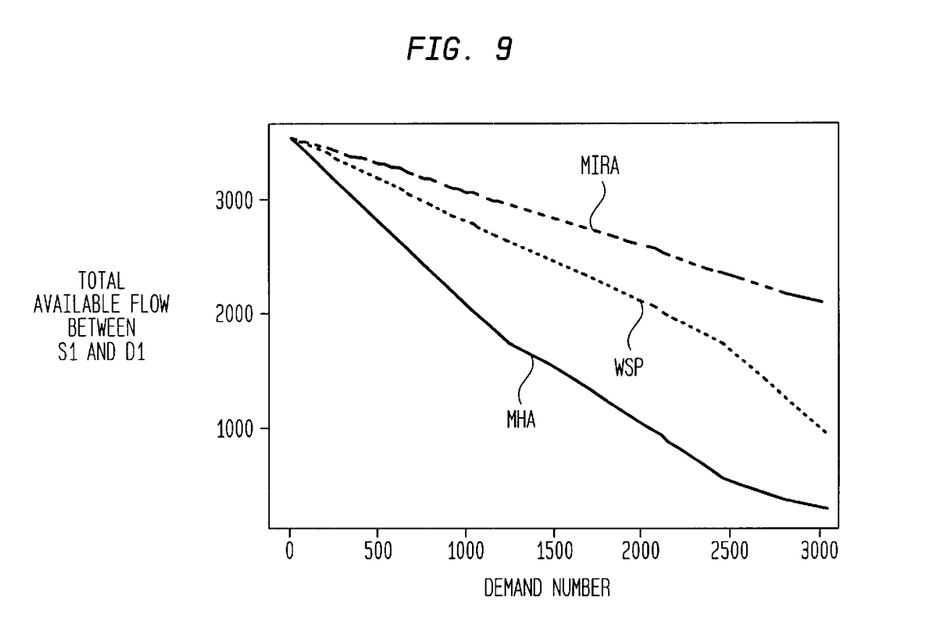
FIG. 9 is a graph of simulation results showing total available flow between an ingress and egress point pair for increasing demand of LSP requests.
Figure 10:
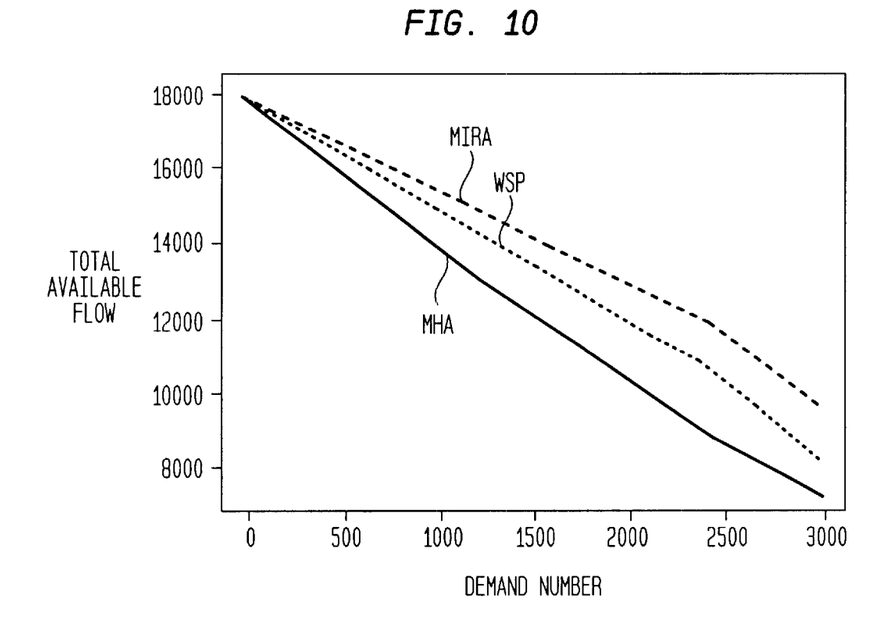
FIG. 10 is a graph of simulation results showing total available flow between all ingress-egress point pairs as a function of demand for the MHA and WSP routing algorithms and MIRA.

Simulations may be performed of a network similar to the network shown in FIG. 7. FIGS. 8–10 show graphs of performance comparisons of the min-hop (MHA) and widest shortest path (WSP) routing algorithms of the prior art with the exemplary MIRA of the present invention. FIG. 8 shows the decrease in available flow (maxflow value) between the ingress and egress point pair ($S_1$, $D_1$) for increasing demand of LSP requests. As shown in FIG. 8, routing in accordance with MIRA (shown with wide-dashed line) has little change in maxflow value until demands of 2500 LSP requests are routed. In contrast, routing LSP demands with either the MHA (solid line) or WSP (dotted line) routing algorithms shows immediate decrease in the maxflow value as demands for LSP requests are routed. Similarly, FIG. 9 shows the total available flow (maxflow value) between the ingress and egress point pair ($S_1$, $D_1$) for increasing demand of LSP requests. FIG. 10 shows the total available flow between all ingress-egress point pairs as a function of demand for the MHA and WSP routing algorithms and MIRA. As shown in FIGS. 9 and 10, MIRA provides greater total available flow for the network when compared to the MHA and WSP algorithms.

Figure 11:
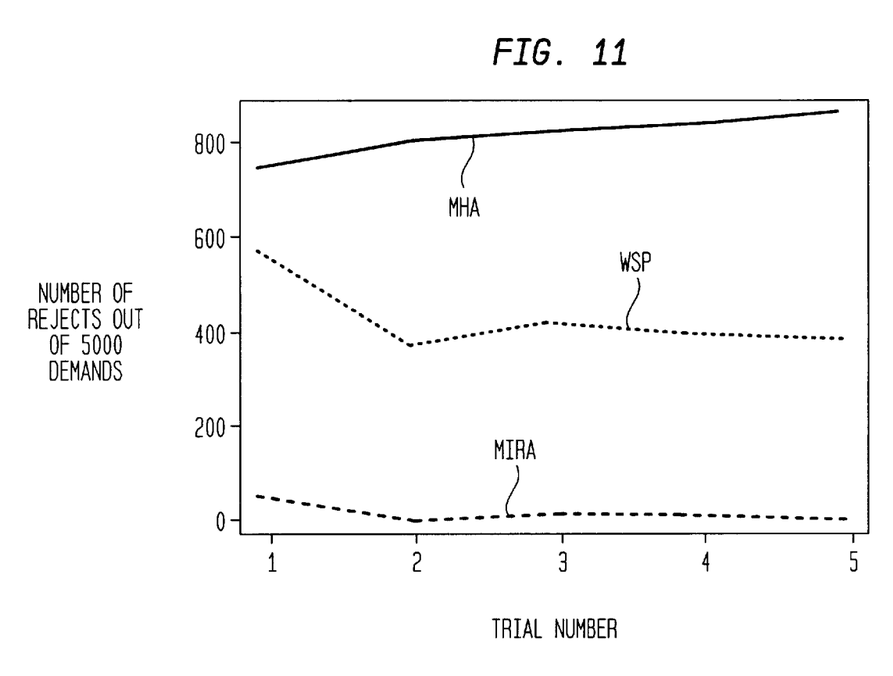
FIG. 11 is a graph of simulation results showing acceptance of new LSP request by a network for several trials of a static case when MHA, WSP and MIRA are employed.
Figure 12:
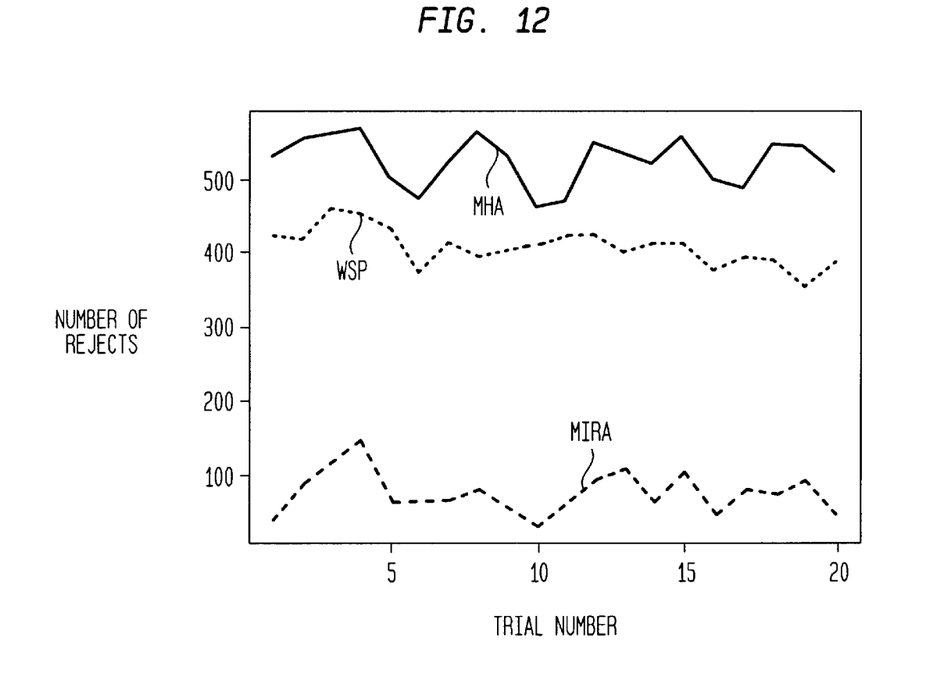
FIG. 12 is a graph of simulation results showing acceptance of new LSP requests by a network for several trials of a dynamic case when MHA, WSP and MIRA are employed.

FIGS. 11 and 12 show graphs illustrating acceptance of new LSP request by a network when MHA, WSP and MIRA are employed. FIG. 11 shows the number of LSP requests that are rejected for a static case of network simulation for the network loaded with demand of 5000 LSP requests for five trials. FIG. 12 shows the number of LSP requests that are rejected for a dynamic case of network simulation for the network loaded with demand of 5000 LSP requests for twenty trials. For the simulation results of FIG. 12, demands bd are uniformly distributed between 1 and 4 units, and the network is loaded with demands of 4000 LSP requests. The LSP requests are randomly long-lived, and newly arriving LSPs have exponential holding times. Once the demands of 7000 LSP requests are complete (including the initial 4000 LSPs), the number of LSP requests rejected due to insufficient bandwidth are counted. This trial is repeated twenty times. As shown in FIGS. 11 and 12, routing in accordance with MIRA has a reduced number of rejected LSP requests when compared to routing with MHA and WSP.

Figure 13:
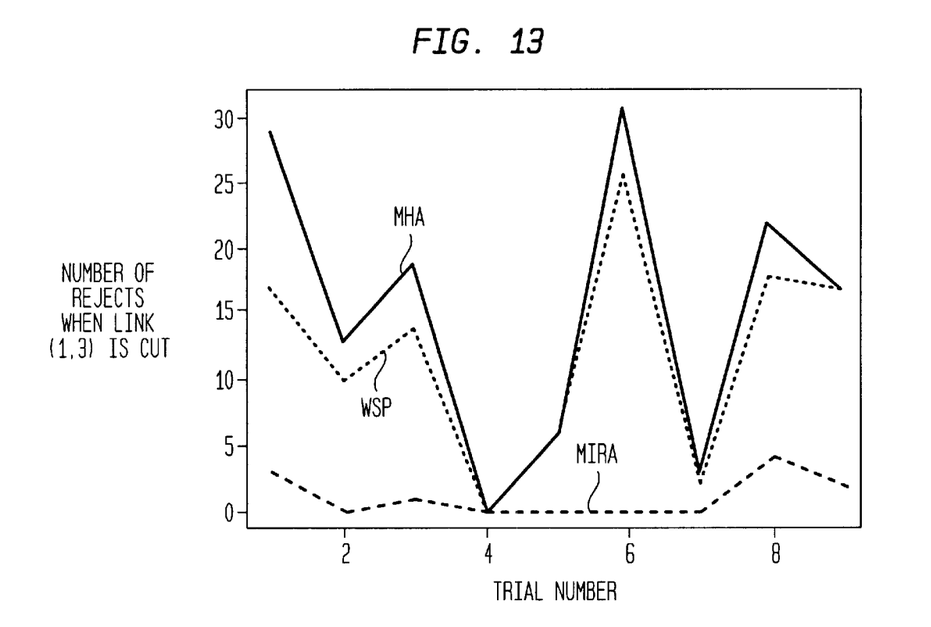
FIG. 13 is a graph of simulation results showing number of rejected LSP requests by a network employing MHA, WSP and MIRA when there is a link failure.

FIG. 13 shows a graph illustrating the number of rejected LSP requests by a network employing MHA, WSP and MIRA when there is a link failure. The network is loaded with the demands of 1800 randomly generated LSPs, a link is broken, and each of MHA, WSP, and MIRA are employed for re-routing. Ten trials are performed and the number of rejected LSP requests is counted. As shown in FIG. 13, MIRA has better performance than MHA or WSP in terms of reduced number of rejected LSP requests.

A method of routing with service level guarantees illustrated by the exemplary embodiments of FIGS. 4 and 5 may provide for the advantages of more efficient utilization of network service level capacity, reducing congestion of routers at network nodes, and higher packet throughput of the network. The method of routing with service level guarantees may be implemented for a requested LSP by either a centralized network management system or each router of the network. An implementation employing a centralized network management system that distributes results to network routers may be preferred for coordination of provisioning of new paths. An implementation in each router of the network may be preferred when no centralized network management system exists and/or if the requested LSP is a distributed request implemented with control packets routed through a network.

As would be apparent to one skilled in the art, the various functions of method of routing with service level guarantees may be implemented with circuit elements or may also be implemented in the digital domain as processing steps in a software program. Such software may be employed in, for example, a digital signal processor, micro-controller or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of routing data through a network of nodes interconnected by links and having a plurality of ingress-egress point pairs, comprising the steps of:

(a) receiving a request for a path with a service demand for routing data between one of the ingress-egress point pairs of the network;

(b) defining a subnetwork of nodes and links employing the nodes and the links of the network and based on the service demand;

(c) defining a set of link weights for the links of the subnetwork accounting for impacts to existing service levels of paths corresponding to the other ingress-egress point pairs of the network, wherein step (c) comprises the steps of:

(c1) calculating a set of maxflow values for the network, (c2) defining a pseudo-network having nodes and links corresponding to the nodes and links of the network, (c3) adjusting an available capacity for each of the links in the pseudo-network based on existing capacity of the links when allowing for the existing service levels of paths of the other ingress-egress point pairs of the network, (c4) setting the available capacity for each of the links in the pseudo-network to a corresponding pseudo-capacity, the pseudo-capacity for each link based on the difference between the corresponding available capacity of the link and the service demand of the request, (c5) determining a set of critical links for the pseudo-network based on each pseudo-capacity, each critical link corresponding to a link of the network that, when the service demand of the request is routed through the link, relates to a reduction of one or more maxflow values, and (c6) calculating each link weight based on a number of the other ingress-egress point pairs having a path including the corresponding link as a critical link; and (d) determining a shortest path through the subnetwork for the request in accordance with the set of weights for the links, the shortest path being the path with the service demand between the one of the ingress-egress point pairs of the network.

2. The invention as recited in claim 1, wherein step (b) comprises the steps of:

(b1) defining the subnetwork having the nodes and the links corresponding to the nodes and links of the network;

(b2) adjusting an available capacity for each of the links in the subnetwork accounting for existing capacity of the links when allowing for the existing service levels of paths of the other ingress-egress point pairs of the network;

(b3) calculating a value for each link based on the difference between the corresponding available capacity of the link and the service demand of the request; and (b4) removing one or more the links of the subnetwork based on each link value.

3. The invention as recited in claim 1, wherein step c(5) determines the set of critical links by adding a link of the pseudo-network to the set of critical links if the link has a predefined amount of pseudo capacity or the link is not included in any path between the ingress-egress point pair of the request.

4. The invention as recited in claim 1, wherein step c(1) computes the maxflow values in accordance with a maximization criteria of either maximizing the sum of the maxflow values or maximizing the sum of the minimum maxflow values.

5. The invention as recited in claim 1, wherein the request of step (a) is a network tunnel request of either an asynchronous mode (ATM) network, an internet protocol (IP) network, or a multi-protocol label switched path MPLS) network.

6. The invention as recited in claim 5, wherein the request is in accordance with either a reservation protocol or a label distribution protocol.

7. Apparatus for routing data through a network of nodes interconnected by links and having a plurality of ingress-egress point pairs, comprising:

an input module for receiving 1) a request for a path with a service demand for routing data between one of the ingress-egress point pairs of the network; and 2) the data associated with the request;

a processing module for determining the path of the request, wherein the processing module:

1) determines the path by:
  (A) defining a subnetwork of nodes and links employing the nodes and the links of the network and based on the service demand;
  (B) defining a set of link weights for the links of the subnetwork accounting for impacts to existing service levels of paths corresponding to the other ingress-egress point pairs of the network; and
  (C) determining a shortest path through the subnetwork for the request in accordance with the set of weights for the links, the shortest path being the path with the service demand between the one of the ingress-egress point pairs of the network; and 2) defines the set of weights by:
  (B1) calculating a set of maxflow values for the network;
  (B2) defining a pseudo-network having nodes and links corresponding to the nodes and links of the network;
  (B3) adjusting an available capacity for each of the links in the pseudo-network based on existing capacity of the links when allowing for the existing service levels of paths of the other ingress-egress point pairs of the network;
  (B4) setting the available capacity for each of the links in the pseudo-network to a corresponding pseudo-capacity, the pseudo-capacity for each link based on the difference between the corresponding available capacity of the link and the service demand of the request;
  (B5) determining a set of critical links for the pseudo-network based on each pseudo-capacity, each critical link corresponding to a link of the network that, when the service demand of the request is routed through the link, relates to a reduction of one or more maxflow values; and
  (B6) calculating each link weight based on a number of the other ingress-egress point pairs having a path including the corresponding link as a critical link; and a switch-fabric for transferring the packets from the input module to an output module of the router in accordance with the path of the request.

8. The invention as recited in claim 7, wherein the processing module defines the subnetwork by:

(A1) defining the subnetwork having the nodes and the links corresponding to the nodes and links of the network;

(A2) adjusting an available capacity for each of the links in the subnetwork accounting for existing capacity of the links when allowing for the existing service levels of paths of the other ingress-egress point pairs of the network;

(A3) calculating a value for each link based on the difference between the corresponding available capacity of the link and the service demand of the request; and (A4) removing one or more the links of the subnetwork based on each link value.

9. A computer-readable medium having stored thereon a plurality of instructions, the plurality of instructions including instructions which, when executed by a processor, cause the processor to implement a method for routing data through a network of nodes interconnected by links and having a plurality of ingress-egress point pairs, the method comprising the steps of:

(a) receiving a request for a path with a service demand for routing data between one of the ingress-egress point pairs of the network;

(b) defining a subnetwork of nodes and links employing the nodes and the links of the network and based on the service demand;

(c) defining a set of weights for the links of the subnetwork accounting for impacts to existing service levels of paths corresponding to the other ingress-egress point pairs of the network, wherein step (c) comprises the steps of:

(c1) calculating a set of maxflow values for the network, (c2) defining a pseudo-network having nodes and links corresponding to the nodes and links of the network, (c3) adjusting an available capacity for each of the links in the pseudo-network based on existing capacity of the links when allowing for the existing service levels of paths of the other ingress-egress point pairs of the network, (c4) setting the available capacity for each of the links in the pseudo-network to a corresponding pseudo-capacity, the pseudo-capacity for each link based on the difference between the corresponding available capacity of the link and the service demand of the request, (c5) determining a set of critical links for the pseudo-network based on each pseudo-capacity, each critical link corresponding to a link of the network that, when the service demand of the request is routed through the link, relates to a reduction of one or more maxflow values, and (c6) calculating each link weight based on a number of the other ingress-egress point pairs having a path including the corresponding link as a critical link; and (d) determining a shortest path through the subnetwork for the request in accordance with the set of weights for the links, the shortest path being the path with the service demand between the one of the ingress-egress point pairs of the network.

10. The invention as recited in claim 9, wherein step (b) comprises the steps of:

(b1) defining the subnetwork having the nodes and the links corresponding to the nodes and links of the network;

(b2) adjusting an available capacity for each of the links in the subnetwork accounting for existing capacity of the links when allowing for the existing service levels of paths of the other ingress-egress point pairs of the network;

(b3) calculating a value for each link based on the difference between the corresponding available capacity of the link and the service demand of the request; and (b4) removing one or more the links of the subnetwork based on each link value.

11. The invention as recited in claim 9, wherein step c(5) determines the set of critical links by adding a link of the pseudo-network to the set of critical links if the link has a predefined amount of pseudo capacity or the link is not included in any path between the ingress-egress point pair of the request.

12. A router for routing data through a network of nodes interconnected by links and having a plurality of ingress-egress point pairs, comprising:

an input module for receiving 1) a request for a path with a service demand for routing data between one of the ingress-egress point pairs of the network; and 2) the data associated with the request;

a processing module for determining the path of the request, wherein the processing module:

1) determines the path by:

(A) defining a subnetwork of nodes and links employing the nodes and the links of the network and based on the service demand;

(B) defining a set of link weights for the links of the subnetwork accounting for impacts to existing service levels of paths corresponding to the other ingress-egress point pairs of the network; and (C) determining a shortest path through the subnetwork for the request in accordance with the set of weights for the links, the shortest path being the path with the service demand between the one of the ingress-egress point pairs of the network; and 2) defines set of the weights by:

(B1) calculating a set of maxflow values for the network;

(B2) defining a pseudo-network having nodes and links corresponding to the nodes and links of the network;

(B3) adjusting an available capacity for each of the links in the pseudo-network based on existing capacity of the links when allowing for the existing service levels of paths of the other ingress-egress point pairs of the network;

(B4) setting the available capacity for each of the links in the pseudo-network to a corresponding pseudo-capacity, the pseudo-capacity for each link based on the difference between the corresponding available capacity of the link and the service demand of the request;

(B5) determining a set of critical links for the pseudo-network based on each pseudo-capacity, each critical link corresponding to a link of the network that, when the service demand of the request is routed through the link, relates to a reduction of one or more maxflow values; and (B6) calculating each link weight based on a number of the other ingress-egress point pairs having a path including the corresponding link as a critical link; and a switch-fabric for transferring the packets from the input module to an output module of the router in accordance with the path of the request.

* * * * *